US012632009B2

(12) United States Patent
Lemonnier et al.

(10) Patent No.: US 12,632,009 B2
(45) Date of Patent: May 19, 2026

(54) TIMEPIECE COMPRISING A CALENDAR MECHANISM AND A MECHANISM FOR CORRECTING THE DATE OR MONTH

(71) Applicant: Manufacture d'Horlogerie Audemars Piguet SA, Le Brassus (CH)

(72) Inventors: Marc Lemonnier, Les Rousses (FR); Arthur Paris, Remoray-Boujeons (FR)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 301 days.

(21) Appl. No.: 18/693,891

(22) PCT Filed: Sep. 28, 2022

(86) PCT No.: PCT/EP2022/076968
§ 371 (c)(1),
(2) Date: Mar. 20, 2024

(87) PCT Pub. No.: WO2023/072518
PCT Pub. Date: May 4, 2023

(65) Prior Publication Data

US 2024/0329602 A1 Oct. 3, 2024

(30) Foreign Application Priority Data

Oct. 25, 2021 (CH) ................................ 070447/2021

(51) Int. Cl.
*G04B 19/25* (2006.01)
*G04B 19/253* (2006.01)

(52) U.S. Cl.
CPC ................................ *G04B 19/2536* (2013.01)

(58) Field of Classification Search
CPC .. G04B 19/2536; G04B 19/253; G04B 19/25; G04B 27/026; G04B 27/04
See application file for complete search history.

(56) References Cited

U.S. PATENT DOCUMENTS 4,026,100 A * 5/1977 Kume ................ G04B 19/2536 368/37
4,261,047 A * 4/1981 Nakao .............. G04B 19/25353 368/37

(Continued)

FOREIGN PATENT DOCUMENTS

| | | | |
|---|---|---|---|
| CH | 697662 | B1 | 1/2009 |
| EP | 2751623 | B1 | 5/2019 |

(Continued)

OTHER PUBLICATIONS

International Search Report and Written Opinion of the ISA for PCT/EP2022/076968 mailed Jan. 31, 2023, 12 pages.

*Primary Examiner* — Sean Kayes
(74) *Attorney, Agent, or Firm* — Nixon & Vanderhye

(57) ABSTRACT

The present invention relates to a timepiece comprising an at least annual date mechanism (1) which comprises a month-management cam (2), a large lever (4) arranged to cooperate with said month-management cam, a date-indicating mechanism, a month-indicating mechanism, and at least one mechanism for independent correction of the date or month comprising at least one date-correcting or month-correcting member, respectively, arranged to cooperate with said date-indicating or month-indicating mechanism, respectively. The date-correcting or month-correcting mechanism, respectively, comprises a date-correcting cam (50) or a month-correcting cam (22), respectively, mounted so as to be freely rotatable, a date-correcting or month-correcting stem, respectively, which can be rotated in order to rotate the date-correcting cam (50) or the month-correcting cam (22), respectively, said date-correcting cam (50) or month-correcting cam (22), respectively, being arranged so as to, during rotation thereof, drive the large lever (4) in order to isolate said large lever (4) at least from the month-management cam (2) before the date or month is corrected, (Continued)

respectively, and to drive the actuation of the date-correcting or month-correcting member, respectively, in order to subsequently correct the date or month, respectively, the rotation of the date-correcting or month-correcting cam, respectively, being controlled solely by rotation of the date-correcting or month-correcting stem, respectively.

14 Claims, 7 Drawing Sheets

(56) References Cited

U.S. PATENT DOCUMENTS

| | | | | |
|---|---|---|---|---|
| 4,427,300 | A * | 1/1984 | Groothuis ............ | G04B 27/005 968/176 |
| 7,706,214 | B2 * | 4/2010 | Scheufele .......... | G04B 19/2536 368/37 |
| 7,782,715 | B2 * | 8/2010 | Crettex .............. | G04B 19/2536 368/37 |
| 10,222,751 | B2 * | 3/2019 | Robin ................ | G04B 19/2536 |
| 10,775,745 | B2 * | 9/2020 | Gilomen .......... | G04B 19/25366 |
| 10,908,556 | B2 * | 2/2021 | Koike .............. | G04B 19/25373 |

FOREIGN PATENT DOCUMENTS

| | | | |
|---|---|---|---|
| EP | 3734373 | A1 | 11/2020 |
| EP | 3882718 | A1 | 9/2021 |

* cited by examiner

TIMEPIECE COMPRISING A CALENDAR MECHANISM AND A MECHANISM FOR CORRECTING THE DATE OR MONTH

CROSS-REFERENCE TO RELATED APPLICATIONS

This application is the U.S. national phase of International Application No. PCT/EP2022/076968 filed Sep. 28, 2022 which designated the U.S. and claims priority to CH 070447/2021 filed Oct. 25, 2021, the entire contents of each of which are hereby incorporated by reference.

TECHNICAL FIELD

The present invention relates to a timepiece comprising an at least annual date mechanism which comprises a month-management cam, a large lever arranged to cooperate with said month-management cam, a date-indicating mechanism, a month-indicating mechanism, and at least one mechanism for independent correction of the date or month comprising at least one date-correcting or month-correcting member, respectively, arranged to cooperate with said date-indicating or month-indicating mechanism, respectively.

PRIOR ART

The mechanical timepieces which comprise an at least annual date mechanism are complications which indicate the date, namely the sequential numeration of the days in a month, by making it possible to take account of the difference at least between the months which have 30 and 31 days (except February). Consequently, it is only necessary to carry out a correction each year at the end of the month of February.

For that purpose, an at least annual month-management cam is provided, the outline of which is shaped in order to at least distinguish the months which have 31 days from the other months.

Semi-perpetual calendars also exist, which take into account all the months of different lengths by means of a month-management cam which is programmed to distinguish between the months which have 31 days, 30 days and 28 days. Leap years are therefore not managed. It is only when a leap year of 366 days occurs, that is to say when there is a 29 February, that these calendars have to be readjusted manually.

Finally, perpetual calendars exist, which take into account all the months of different lengths as well as the leap years thanks to a month-management cam which is programmed to distinguish between the months which have 31 days, 30 days, 28 days, and the months which have 29 days in leap years.

In the present description, an at least annual date mechanism is to be understood in the broad sense and includes the annual, semi-perpetual and perpetual calendars.

Traditionally, the month-management cam comprises, for example, solid parts and notches which are more or less deep as a function of the length of the month. The large lever features a feeler spindle in contact with the month-management cam, which makes it possible to define the movement that the large lever must have in order to drive the 31-days star of the number of days which is a function of the current month.

Even if these calendar mechanisms are designed to function in a semi-automatic or indeed completely automatic manner, month and date correctors are provided in order to correct the month and the date manually in the event of the watch stopping, for example.

These correctors are traditionally correctors provided on the flank of the middle of the watch, and which move under the action of a pressure applied to the corrector in order to make the correction, for example, by means of a correction stylus. These correctors are generally arranged to lift the large lever in order to isolate it from the month-management cam in order to subsequently be able to make the correction without breaking the mechanism.

These correctors which are added to the middle are additional sources of water resistance problems. Furthermore, they generally need a tool such as a correction stylus in order to be capable of being actuated by the application of a pressure. Moreover, it is necessary to provide return springs in order to return the correctors to a neutral position following the correction. These return springs occupy a certain space in a complex mechanism of an at least annual calendar already comprising a large number of elements.

In order to overcome these drawbacks, a mechanism for correcting the date by the winding stem has been proposed for the simple date mechanisms. For example, patent EP 2 751 623 describes a date mechanism in which the winding stem is moved axially in translation into a correction position, this axial movement making it possible to control an isolating lever in order to isolate the calendar lever from the date star. This subsequently makes it possible to correct the date star by rotating the winding stem by means of an additional geartrain.

However, the mechanism described in patent EP 2 751 623 uses an additional geartrain in order to make the correction, as such, of the date star by rotation of the winding stem after having isolated the date star by a traction on the winding stem. The isolation is effected by means of a lever, controlled by numerous rods and other levers, making the mechanism very complex and resulting in numerous amounts of play to be managed between the different rods and levers. The levers pivot by a few degrees and must be provided with return springs in order to return to the initial position. This mechanism cannot therefore be applied to the complex mechanism of an at least annual calendar already comprising a large number of elements in a limited space.

It is therefore necessary to propose a new correction mechanism for an at least annual calendar, making it possible to correct the date and/or the month in a simple, rapid and secure manner, and without tools.

Another object of the present invention is to propose a correction mechanism for an at least annual calendar comprising a number of reduced elements, and making it possible to make the different corrections to the date and the month in an independent manner, by means of a single correction stem, such as the winding stem.

DISCLOSURE OF THE INVENTION

To this end, the invention relates to a timepiece comprising an at least annual date mechanism which comprises a month-management cam, a large lever arranged to cooperate with said month-management cam, a date-indicating mechanism, a month-indicating mechanism, and at least one mechanism for independent correction of the date or month comprising at least one date-correcting or month-correcting member, respectively, arranged to cooperate with said date-indicating or month-indicating mechanism, respectively.

According to the invention, the date-correcting or month-correcting mechanism, respectively, comprises a date-correcting or month-correcting cam, respectively, mounted so as to be freely rotatable, a date-correcting or month-correcting stem, respectively, which can be rotated in order to rotate the date-correcting or the month-correcting cam, respectively, said date-correcting or month-correcting cam, respectively, being arranged so as to, during rotation thereof, drive the large lever in order to isolate said large lever at least from the month-management cam before the date or month is corrected, respectively, and to drive the actuation of the date-correcting or month-correcting mechanism, respectively, in order to subsequently correct the date or month, respectively, the large lever then being isolated, the rotation of the date-correcting or month-correcting cam, respectively, being controlled solely by rotation of the date-correcting or month-correcting stem, respectively.

Thus, the correction mechanism of the invention advantageously makes it possible to carry out independent corrections of the date and month in an at least annual calendar, by means of a correction stem, but without having to previously move the correction stem axially in order to isolate the large lever. The correction mechanism of the invention is therefore particularly useful when the axial movement of the correction stem is reserved for another functionality. The correction mechanism of the invention makes it possible to isolate the large lever and to make the correction to the date or the month in a fluid manner, the isolation and the correction being effected in a linked and continuous manner by means of elements belonging to one and the same kinematic chain, these elements being all or partly movable in rotation, and driven solely by continuous rotations of a correction stem.

According to a first embodiment relating to the correction of the month, the month-correcting member is constituted by a month-correcting pinion which is kinematically linked to the month-indicating mechanism and placed on the path of the month-correcting cam.

Thus, the month correction is realized directly by the month-correcting cam rotated by rotation of the month-correcting stem.

According to another embodiment relating to the correction of the date, the date-correcting member is constituted by a date-correcting beak which is mounted movably in rotation on the large lever and provided with a return spring, and arranged to be capable of cooperating with the date-indicating mechanism when the date-correcting cam drives the large lever once it is isolated from the month-management cam.

Thus, the correction of the date is realized indirectly during the rotation of the date-correcting cam which is rotated by rotation of the date-correcting stem.

The date-correcting stem and/or the month-correcting stem is/are preferably constituted by the winding stem of the timepiece, said winding stem being arranged so that its rotation in one direction corrects the date, its rotation in the other direction correcting the month.

Thus, the correction mechanism according to the invention makes it possible to eliminate the date and month correctors on the flanks of the middle and to replace them by the single winding stem, which reduces the problems linked to water resistance. This also advantageously makes it possible to improve the aesthetic aspect of the watch by eliminating, for example, all the correction buttons which are usually present on the circumference of the watch case, the winding stem alone making it possible to correct the date and the month.

BRIEF DESCRIPTION OF THE DRAWINGS

Other characteristics and advantages of the present invention will appear on reading the following detailed description of an embodiment of the invention, provided by way of non-limiting example and with reference to the appended drawings, wherein.

EMBODIMENTS OF THE INVENTION

The present invention relates to a mechanical timepiece, comprising an at least annual date mechanism, that is to say annual, semi-perpetual or perpetual, and which comprises a month-management cam on at least one year.

In the remainder of the description, the illustrated example is that of a perpetual calendar with, as the month-management cam, a 48-months cam which comprises, in the depicted example, notches which are more or less deep, each of them corresponding to a month of four consecutive years. The deepest notch corresponds to a month of February which has 28 days. It is obvious that the 48-months cam can be replaced by a 12-months or 36-months cam, the outline of which is shaped according to the type of calendar or the manner of managing the leap years. In the case of a perpetual calendar, it is possible to have, for example, a 12-months cam associated with a leap year cam or with a Maltese cross. These mechanisms are known to the person skilled in the art.

In the remainder of the description, only the calendar elements which are necessary to understand the invention are depicted. These elements as well as the other elements of an at least annual calendar are well known to the person skilled in the art, in terms of their global function, such that a detailed description of these elements is not necessary when these elements do not differ from the calendar mechanisms known to the person skilled in the art.

Figure 1:
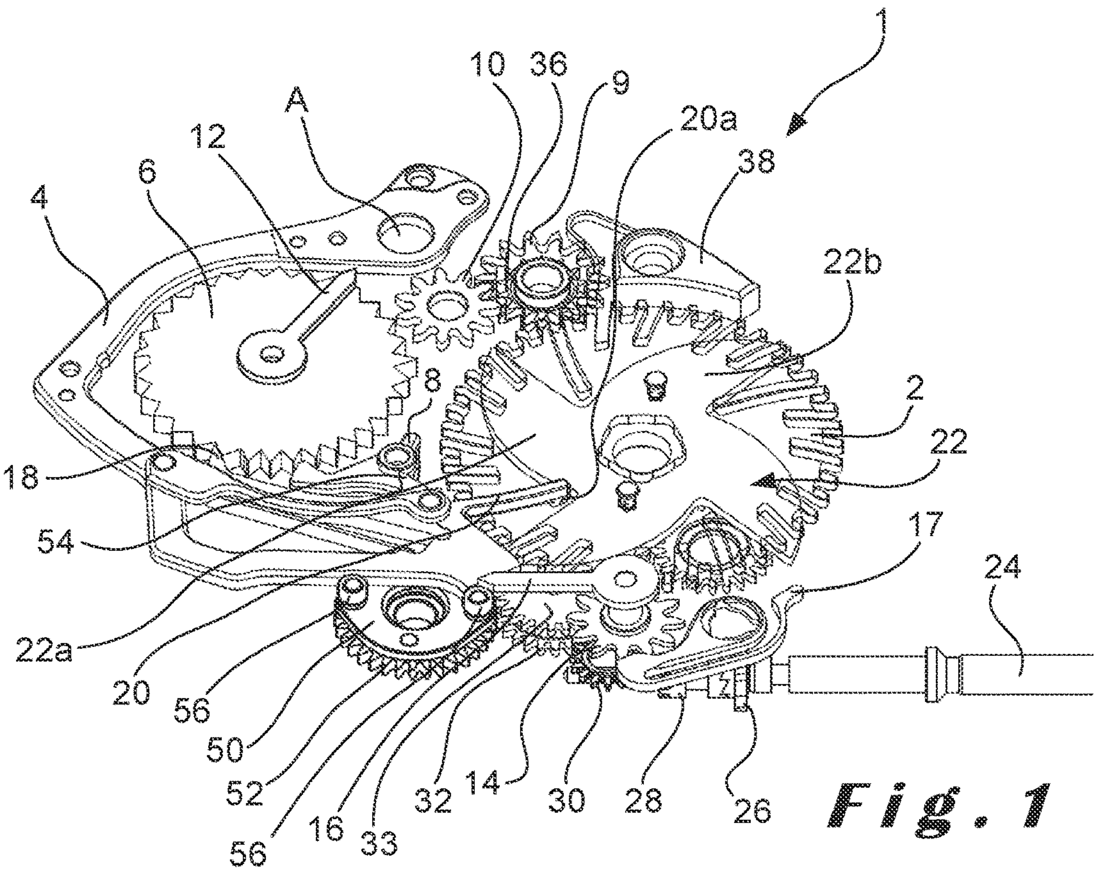
FIG. 1 is an isometric view from above of a date-correcting mechanism and of a month-correcting mechanism of a perpetual calendar according to the invention, in a neutral position.
Figure 2:
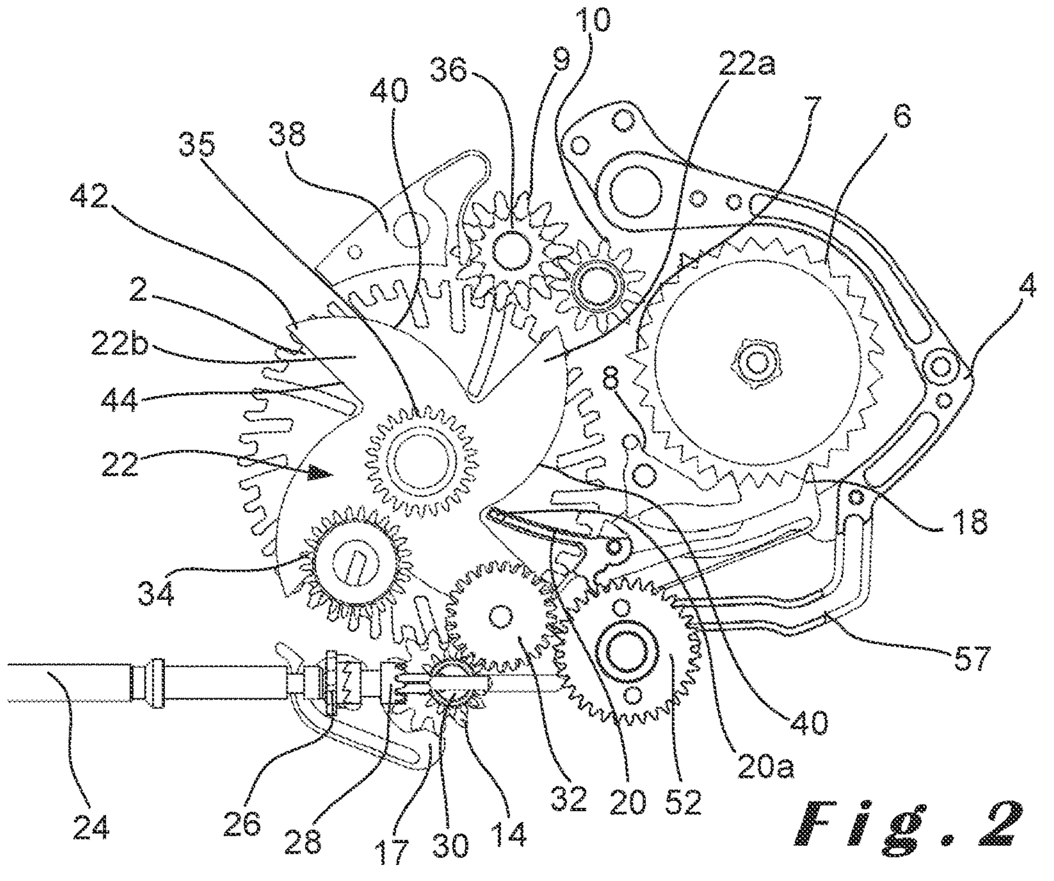
FIG. 2 is a bottom view of the mechanisms from FIG. 1.

With reference to FIGS. 1 and 2, the perpetual date mechanism 1 depicted comprises at least, in addition to a 48-months cam 2 for managing the months, a large lever 4 mounted pivoting at A on the frame, a 31-days star 6 carrying a month drive finger 7 and provided with its jumper 8, a month drive pinion 9 intended to cooperate with said 31-days star 6, here by way of an intermediate wheel 10 driven by the month drive finger 7 at the end of each month. The month drive pinion 9 is also arranged to cooperate with the month-management cam 2, with which it engages here directly. It is obvious that it is possible to provide different intermediate wheels in order to make possible a direct or indirect kinematic link between the 31-days star 6, the month drive pinion 9 and the month-management cam 2, or not.

A date-indicating mechanism comprising a date-indicating member 12 (such as a hand), kinematically linked to the 31-days star 6, and a month-indicating mechanism kinematically linked to the 48-months cam 2 are also provided.

In the depicted example, the month-indicating mechanism comprises a month-indicating pinion 14 carrying a month-indicating member 16, such as a hand, and kinematically linked to the month-management cam 2, here by direct engagement. The month-indicating member 16 is provided with a jumper 17. It is obvious that the month-indicating pinion could be replaced by an indicating wheel for the 48 months, which is rigidly connected to the 48-months cam 2. However, the month-indicating pinion has, in particular, the advantage of being capable of displaying the months over 12 months, instead of 48 months.

The large lever 4 comprises a first beak 18 which is provided to drive the 31-days star 6 by one step when said large lever 4 is raised once a day, actuated by an element of the movement which is provided for this purpose.

The large lever 4 also comprises a feeler spindle 20 arranged to cooperate with the month-management cam 2 by positioning itself in one or other of the notches of said month-management cam 2 when the large lever 4 is not raised each day in order to actuate the 31-days star 6.

Since these different elements of the date mechanism are known to the person skilled in the art, it is not necessary to provide further details about their construction and their functioning.

In order to be able to independently correct the date or the month, for example in the event of the watch stopping, a date-correcting mechanism comprising at least one date-correcting member arranged to cooperate with the date-indicating mechanism, by way of the 31-days star 6, and a month-correcting mechanism comprising at least one month-correcting member arranged to cooperate with the month-indicating mechanism, by way of the 48-months cam 2, are provided.

First of all, the month-correcting mechanism is described in connection with FIGS. 1 to 9.

In accordance with the invention, the month-correcting mechanism comprises a month-correcting cam 22, mounted so as to be freely rotatable, that is to say free to turn by an angle which can be greater than or equal to 360°. Unlike a lever, it does not therefore need a return spring.

The month-correcting cam 22 is preferably mounted so as to be freely rotatable on the axis of the 48-months cam 2, such that said month-correcting cam 22 is coaxial with the month-management cam 2. Advantageously, the month-correcting cam 22 is mounted under the 48-months cam 2, as shown in FIG. 2 (the month-correcting cam 22 shows through in FIG. 1).

The month-correcting mechanism also comprises a month-correcting stem, arranged to be capable of being moved in rotation in order to rotate the month-correcting cam 22. In a particularly preferred embodiment depicted here, the month-correcting stem is the winding stem 24. It is arranged so that its rotation in one direction corrects the month and so that its rotation in the other direction corrects the date, as will be described below.

The winding stem is the control stem developed by the applicant and which is the subject-matter of the application CH 00357/21. This control stem makes it possible to select two functions, here the month correction and date correction functions, by a movement in axial translation of the control stem in one direction, the functions subsequently being respectively actuated by rotation of the control stem in one direction for one function, and in the other direction for the other function, and in order to select two other functions by a movement in axial translation of the control stem in the other direction, these functions subsequently being actuated by rotation of the control stem in one direction for one function, and in the other direction for the other function.

Figure 4:
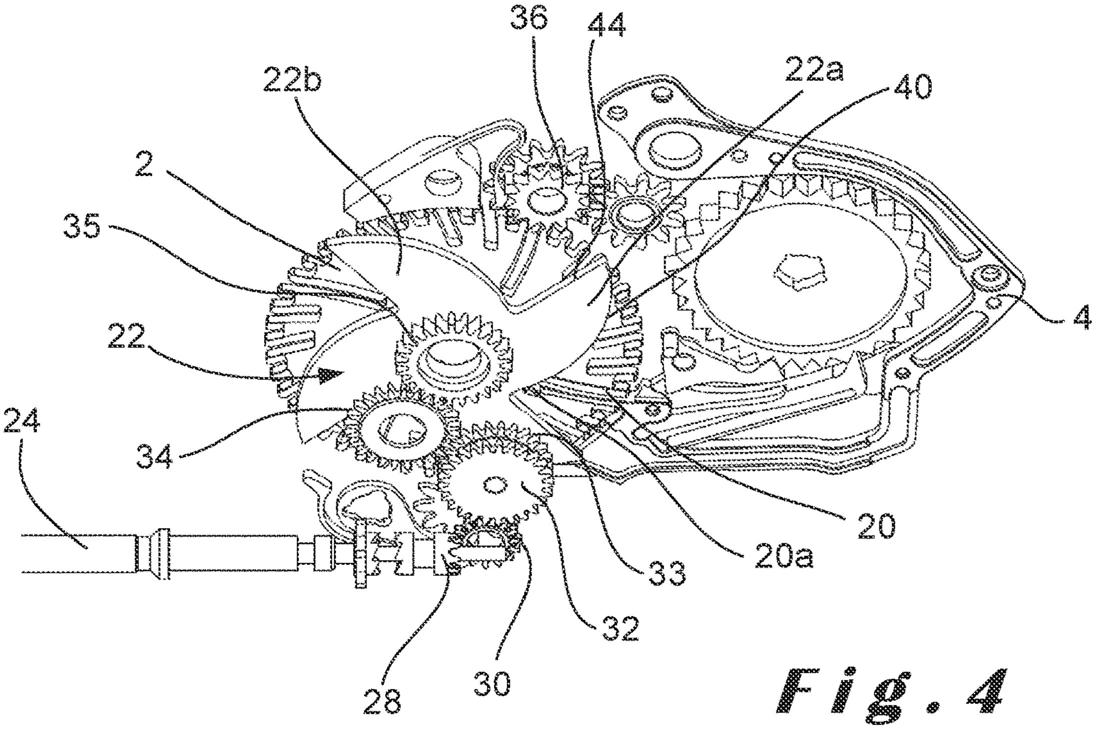
FIG. 4 is a bottom view.

The winding stem 24 comprises a winding pinion 26 and a sliding pinion 28 arranged to engage with an intermediate wheel 30, as depicted in FIG. 4, after the winding stem 24 has been moved axially in order to select the month-correcting or date-correcting functions.

The month-correcting mechanism also comprises a first geartrain kinematically linking the winding stem 24 to the month-correcting cam 22, advantageously positioned below the month-correcting cam 22.

Said first geartrain comprises a first wheel 32 engaging with the intermediate wheel 30 in order to be capable of cooperating with the sliding pinion 28 carried by the winding stem 24, an intermediate wheel 33 rigidly connected to the first wheel 32, another intermediate wheel 34 arranged to engage with the intermediate wheel 33 coming into contact when the winding stem is turned in the actuating direction of the month correction after having selected the month-correcting or date-correcting functions, and a last wheel 35 rigidly connected at least in rotation to the month-correcting cam 22 and arranged to engage with the intermediate wheel 34 when the month-correcting function is selected. The last wheel 35 is preferably coaxial with the month-correcting cam 22 with which it is rigidly connected, and with the 48-months cam 2.

The wheels 32, 33 and 34 are wheels carried by the actuating lever (not represented) described in application CH 00357/21, said wheels 32, 33, 34 positioning themselves in order to kinematically link the winding stem 24 to the month-correcting cam 22 in order to rotate said month-correcting cam 22 (via the wheel 35) solely by rotation of the month-correcting stem, that is to say the winding stem 24, after having selected the month-correcting or date-correcting functions by axial movement of said winding stem 24.

The month-correcting mechanism also comprises a month-correcting member constituted preferably by a month-correcting pinion 36, provided with its jumper 38, said month-correcting pinion being kinematically linked to the month-indicating mechanism.

More particularly, the month-correcting pinion 36 is arranged to be kinematically linked to the month-management cam 2, for example, by way of the month drive pinion 9. The month-correcting pinion 36 is preferably mounted coaxially under the month drive pinion 9 in a rigidly connected manner. It is also placed in order to be on the path of the month-correcting cam 22.

According to the invention, the month-correcting cam 22 is arranged, during the rotation thereof which is controlled solely by rotation of the month-correcting stem, that is to say the winding stem 24 here, to first of all drive the large lever 4 in order to move away said large lever 4 in order to isolate it at least from the month-management cam 2 before the month is corrected, and to drive the actuation of the month-correcting pinion 36, by directly driving said month-correcting pinion 36, in order to subsequently correct the month as it continues rotating.

To this end, the month-correcting cam 22 comprises at least two arms **22*a*, 22*b* extending globally radially, the large lever 4 and the month-correcting pinion 36 being arranged to be placed on the path of said arms 22*a*, 22*b*, one of the arms 22*a* being arranged to remove the large lever 4 from the month-management cam 2, and the other arm 22*b* being arranged to subsequently actuate the month-correcting pinion 36 and, therefore, the 48-months cam 2 via the month drive pinion 9, the large lever 4 then being isolated, during the continuous rotation of the month-correcting cam 22** which is controlled by the rotation of the month-correcting stem, that is to say the winding stem 24 here.

The large lever 4 advantageously comprises a feeler spindle placed on the path of the arms 22*a*, 22*b* of the month-correcting cam 22 and arranged to be capable of cooperating with one of said arms 22*a*, 22*b*. Said feeler spindle is preferably the feeler spindle 20 here, which also cooperates with the 48-months cam 2. However, it is of course possible to provide, on the large lever 4, another feeler spindle positioned in another location and provided in order to solely cooperate with the month-correcting cam 22.

Each arm 22*a*, 22*b* of the month-correcting cam 22 preferably comprises, on the side which will come into contact with the feeler spindle of the large lever 4 during the rotation of the month-correcting cam 22, an outline 40 of rounded form starting from the center towards the outside, shaped in order to make said feeler spindle 20 rise progressively on said arm 22*a*, 22*b*, causing the large lever to tilt at A until said large lever 4 and, more particularly here the feeler spindle 20, is moved away from the month-management cam 2.

In order to be able to completely isolate the large lever 4 from the 48-months cam 2, the maximum radius of the arms 22*a*, 22*b* is greater than the radius of the 48-months cam 2.

The feeler spindle 20 advantageously has at least at the end 20*a* of its lower face, a thickness configured in order to exit the plane of the month-correcting cam 22 in order to be capable of cooperating with the outline 40 of one of the arms 22*a*, 22*b* of the month-correcting cam 22.

Furthermore, the outline 40 of the arm 22*a*, 22*b* advantageously ends at the level of the maximum radius of the arm 22*a*, 22*b* by forming a beak 42 with the other outline 44 of the arm 22*a*, 22*b* which extends radially in the direction of the center. The beak 42 is arranged to be capable of cooperating with the month-correcting pinion 36 when the path of the arm 22*a*, 22*b* crosses the toothing of the month-correcting pinion 36.

The arms 22*a*, 22*b* are preferably identical in order to be able to both isolate the large lever 4 and to drive the month-correcting pinion 36.

The arms 22*a*, 22*b* are advantageously regularly distributed around the center of the month-correcting cam 22. The number of arms 22*a*, 22*b* and the placement of the feeler spindle 20 and of the month-correcting pinion 36 around the month-correcting cam 22 are preferably chosen so as to make a correction with the lowest possible number of turns of the winding stem 24.

Thus, the month-correcting cam 22 is in helical form, and can comprise, for example, four arms (including the arms 22*a*, 22*b*, 22*c*) distributed at 90°, forming blades.

The month-correcting mechanism functions as follows:

With reference to FIGS. 1 and 2, when the correction mechanisms are in the neutral position, the winding stem 24 is in the neutral position, for example of winding, such that the sliding pinion 28 does not engage with the intermediate wheel 30. The perpetual date mechanism functions in the standard manner and is controlled by the movement of the timepiece. The month-correcting mechanism is not operational.

In the event of the date mechanism stopping, for example, on 28 February of a non-leap year, the feeler spindle 20 of the large lever 4 is positioned in the deepest notch of the 48-months cam 2, this position being that in which the large lever 4 has the most angular movement to perform during the month correction in order to completely remove the feeler spindle 20 from the notch of the 48-months cam 2. The feeler spindle 20 is positioned in the notch of the 48-months cam 2 such that its end 20*a* is located in the proximity of the base of the rounded outline 40 of one of the arms 22*a* of the month-correcting cam 22. The arm 22*b* preceding the arm 22*a* (seen from above) is moved away from the month-correcting pinion 36.

Figure 3:
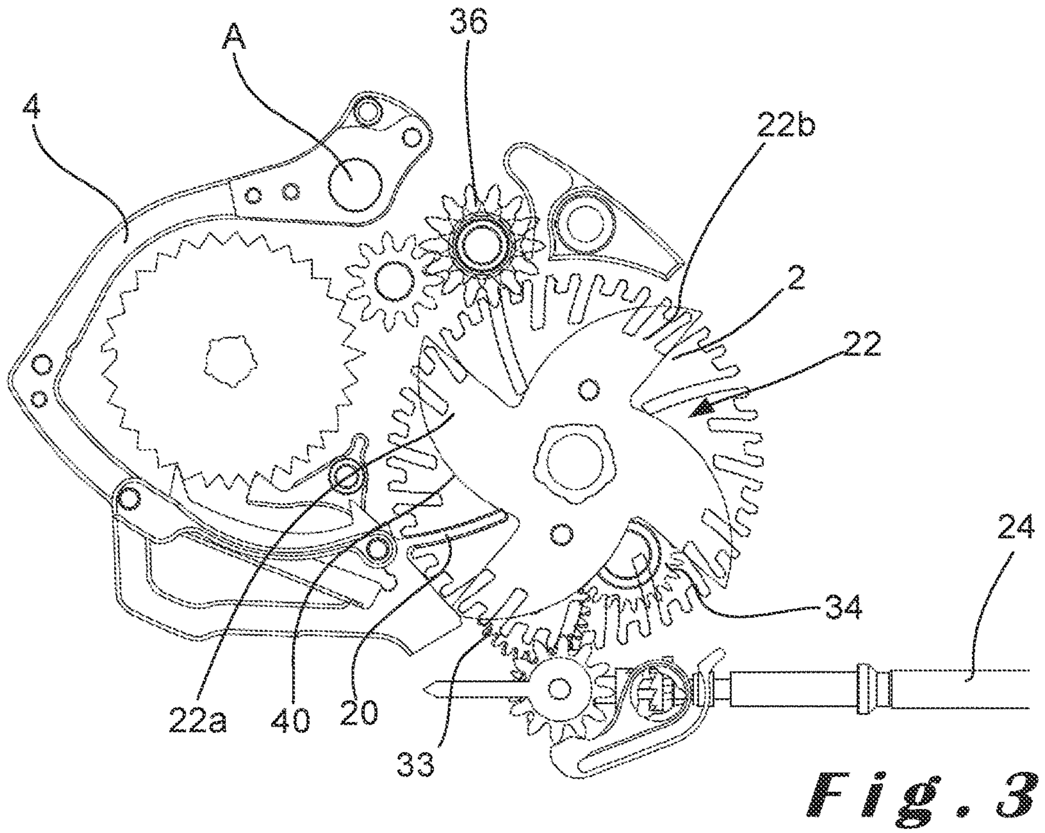
FIG. 3 is a top view.

In order to make a correction of the month, and with reference to FIGS. 3 and 4, the winding stem 24 is moved axially such that the sliding pinion 28 engages with the intermediate wheel 30 and such that the first geartrain is formed by the movement of the wheels 32, 33 and 34 in order to kinematically link the winding stem 24 to the wheel 35 which is rigidly connected to the month-correcting cam 22 (as shown in FIG. 4).

The winding stem 24 is then turned in one direction such that the month-correcting cam 22 is rotated in the anticlockwise direction, the month-correcting cam 22 being seen from above in FIG. 3. During this rotation, the base of the rounded outline 40 of the arm 22*a* enters into contact with the end 20*a* of the feeler spindle 20 which goes beyond the plane of the month-correcting cam 22 such that said feeler spindle 20 begins to rise on the outline 40 of the arm 22*a* in order to exit its notch, the thrust of the arm 22*a* on the feeler spindle 20 pivoting the large lever 4 at A. In parallel, the arm 22*b* of the month-correcting cam 22 begins to approach the month-correcting pinion 36.

Figure 5:
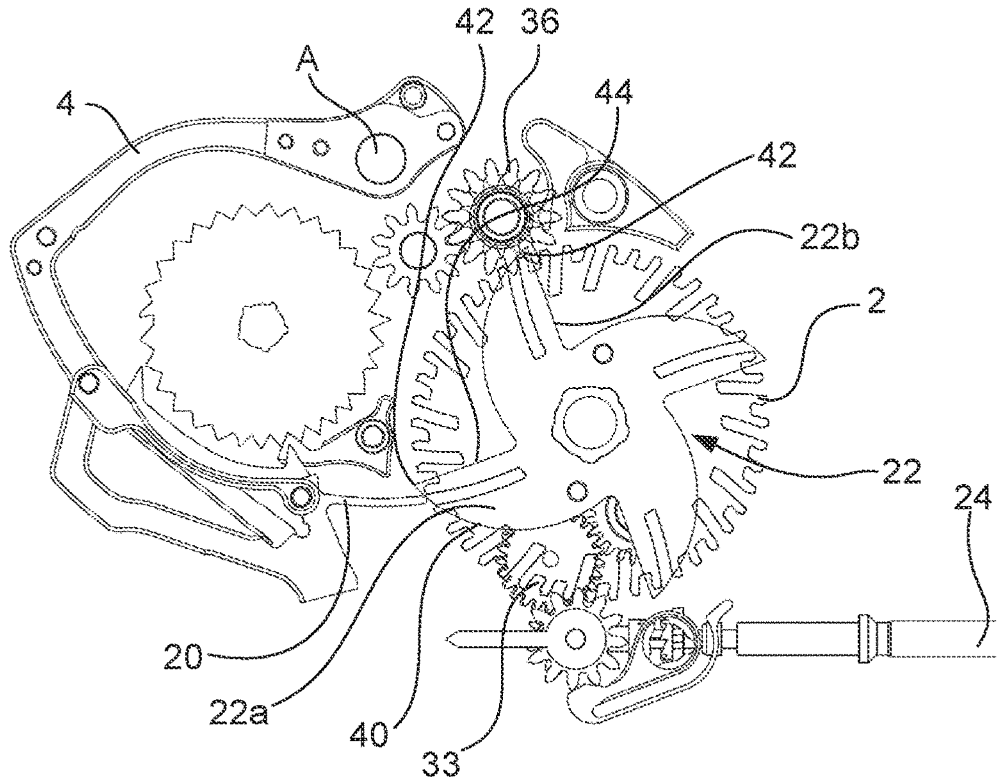
FIG. 5 is a top view.
Figure 6:
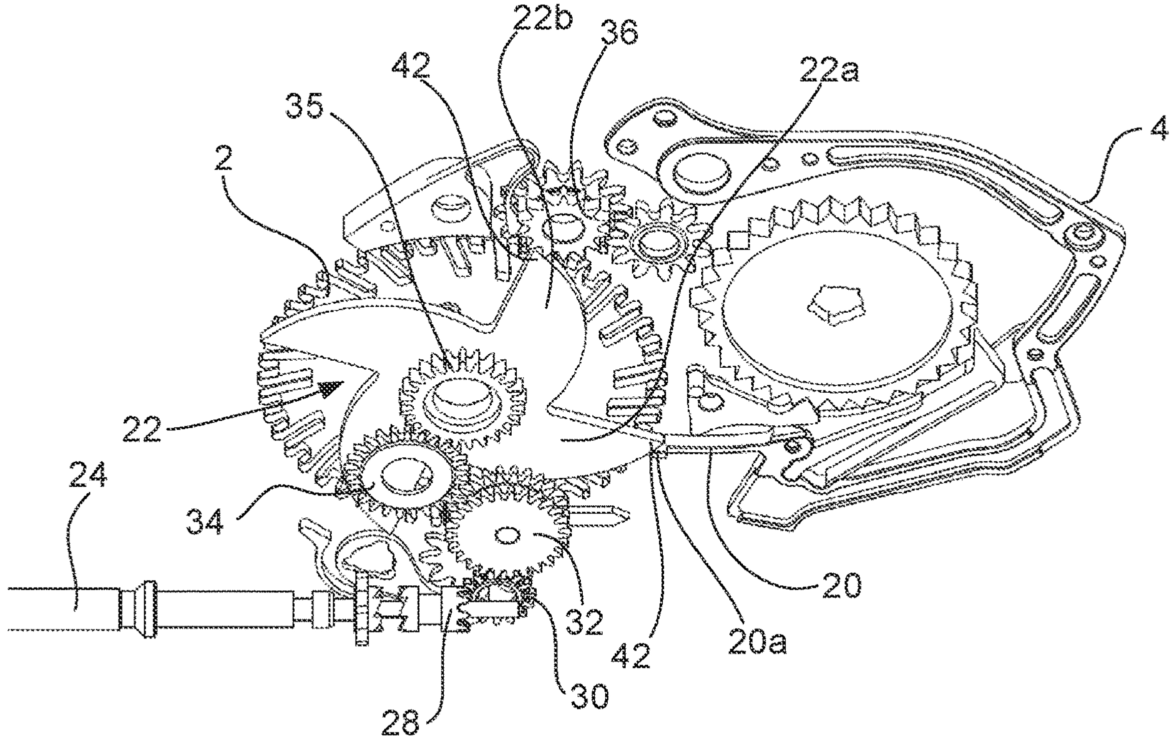
FIGS. 6 and 7 are bottom views.

Subsequently, with reference to FIGS. 5 and 6, the rotation of the winding stem 24 is continued, continuously rotating the month-correcting cam 22 such that the end 20*a* of the feeler spindle 20 follows the rounded outline 40, the large lever 4 pivoting around its axis A in the clockwise direction, seen from above. Thus, the end 20*a* of the feeler spindle 20 gradually rises on the arm 22*a* until it arrives at the top of the rounded outline 40 of the arm 22*a*, close to the beak 42 of the arm 22*a*, such that the feeler spindle 20 has totally exited the notch of the 48-months cam 2. The large lever 4 is therefore moved away from the 48-months cam 2 and is isolated from the latter. In parallel, the beak 42 of the arm 22*b* has turned in order to approach the month-correcting pinion 36.

Figure 7:
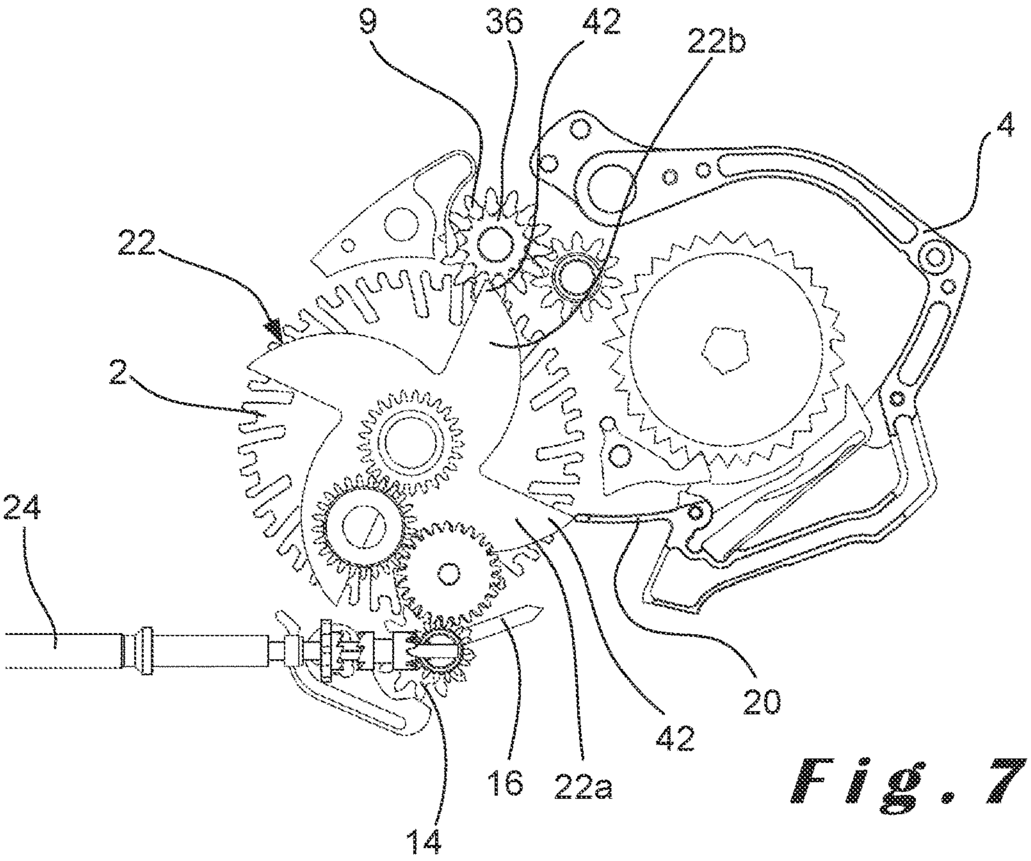

With reference to FIG. 7, the rotation of the winding stem 24 is continued, continuously rotating the month-correcting cam 22, such that the beak 42 of the arm 22*b* meets a tooth of the month-correcting pinion 36 which is located on the path of the arm 22*b*. The continuous rotation of the month-correcting cam 22 then rotates the month-correcting pinion 36 by one step, which causes the month drive pinion 9 to rotate by one step, and therefore rotates the 48-months cam 2, in order to rotate the month-indicating pinion 14 by one step, and to correct the month hand 16 by one step. In parallel, the feeler spindle 20 has reached the top of the beak 42 of the arm 22*a*, such that the large lever 4 was still very isolated from the 48-months cam 2 at the time the month is corrected as such by the month-correcting pinion 36.

Figure 8:
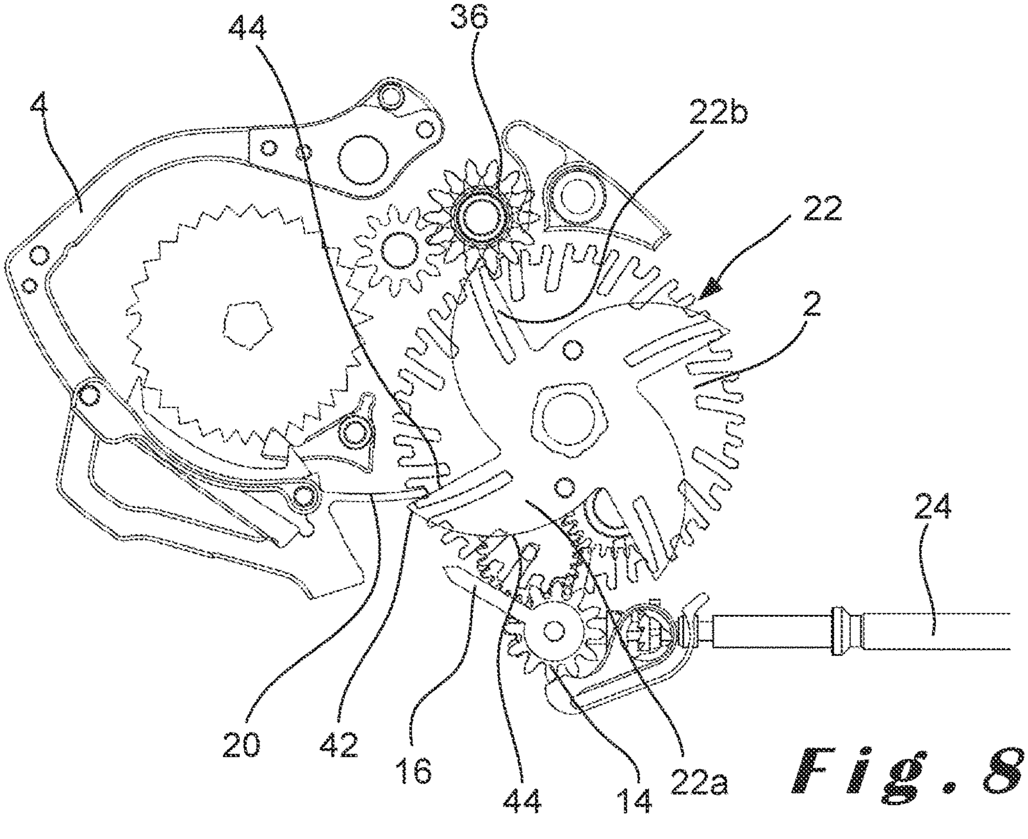
FIGS. 8 and 9 are top views of the month-correcting mechanism from FIG. 1 in different positions during the course of a month correction.

With reference to FIG. 8, once a correction by one step has been made, the rotation of the winding stem 24 is continued, continuously rotating the month-correcting cam 22 such that the beak 42 of the arm 22*a* goes beyond the feeler spindle 20. The large lever 4 is then brought back by its return spring resting on the 48-months cam 2, its feeler spindle 20 falling beyond the straight outline 44 of the arm 22*a*, into the following notch of the 48-months cam 2 corresponding to the month of March. In parallel, the arm 22*b* has moved away from the month-correcting pinion 36.

Figure 9:
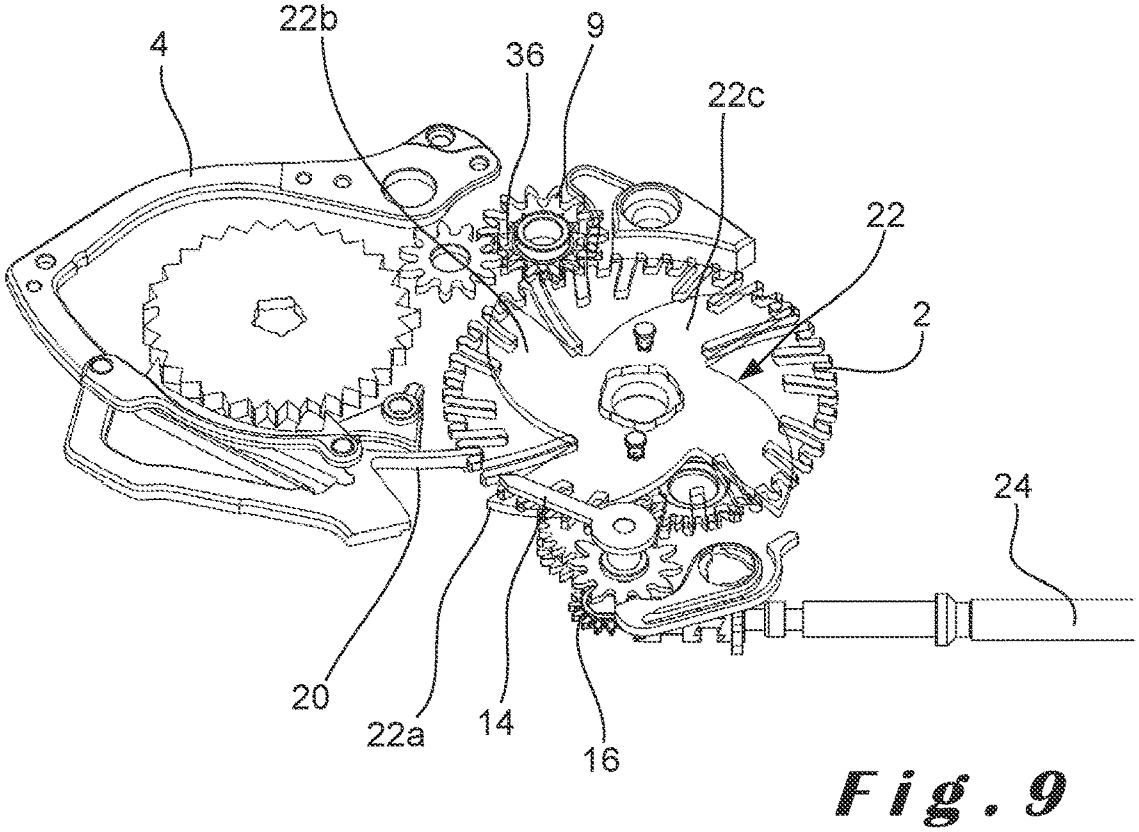

If another month correction is necessary, the rotation of the winding stem 24 is continued in order to continue to rotate the month-correcting cam 22 such that the arm 22*b* turns in order to approach the feeler spindle 20 of the large lever and the arm 22*c* preceding the arm 22*b* (seen from above) turns in order to approach the month-correcting pinion 36, as shown in FIG. 9. The mechanism is then ready to make a new correction as described above.

The date-correcting mechanism is now described in connection with FIGS. 1, 2 and 10 to 13.

In accordance with the invention, the date-correcting mechanism comprises a date-correcting cam 50, mounted so as to be freely rotatable on the frame, that is to say free to turn by an angle which can be greater than or equal to 360°. Unlike a lever, it does not therefore need a return spring.

The date-correcting mechanism also comprises a date-correcting stem, arranged to be capable of being moved in rotation in order to rotate the date-correcting cam 50. In a particularly preferred embodiment depicted here, the date-correcting stem is the same stem as the month-correcting stem, that is to say the winding stem 24. As already seen above, the winding stem 24 is arranged so that its rotation in one direction corrects the month and so that its rotation in the other direction corrects the date, by way of the sliding pinion 28 and the intermediate wheel 30.

To this end, the date-correcting mechanism comprises a second geartrain kinematically linking the sliding pinion 28 carried by the winding stem 24 to the date-correcting cam 50. More particularly, the second geartrain comprises the first wheel 32 which engages with the intermediate wheel 30 in order to be capable of cooperating with the sliding pinion 28 and a last wheel 52 rigidly connected at least in rotation to the date-correcting cam 50 and arranged to engage with the first wheel 32 when the date correction function is selected. The last wheel 52 is preferably mounted rigidly connected coaxially to the date-correcting cam 50.

As already described above, the wheel 32 is carried by the actuating lever (not represented) described in application CH 00357/21, said wheel 32 positioning itself in order to kinematically link the winding stem 24 to the date-correcting cam 50 in order to rotate said date-correcting cam 50 (via the wheel 52) solely by rotation of the date-correcting stem, that is to say the winding stem 24, after having selected the month-correcting or date-correcting functions by axial movement of said winding stem 24.

The date-correcting mechanism also comprises a date-correcting member preferably constituted by a date-correcting beak 54 mounted movably in rotation on the large lever 4 and provided with a return spring. The date-correcting beak 54 is placed on the large lever 4 with respect to the 31-days star 6 so as to approach said 31-days star 6 in order to be able to cooperate with the date-indicating mechanism, by way of the 31-days star 6, when the date-correcting cam 50 drives the large lever 4 once it is isolated from the 48-months cam 2.

According to the invention, the date-correcting cam 50 is arranged, during the rotation thereof which is controlled solely by rotation of the date-correcting stem, that is to say the winding stem 24 here, to first drive the large lever 4 in order to move said large lever 4 away in order to isolate it at least from the month-management cam 2 and in order to also isolate it from the 31-days star 6 before the date is corrected when the correction involves a change of month, and in order to subsequently drive the actuation of the date-correcting beak 54, indirectly via driving the large lever 4, in order to correct the date as it continues rotating.

To this end, the date-correcting cam 50 carries at least one driving stud 56 preferably provided with a runner. The driving stud 56 is arranged to pivot the large lever 4 at A in the direction which makes it possible to move the large lever 4 away from the month-management cam 2, here in the clockwise direction, seen from above, the date-correcting cam 50 turning in the anticlockwise direction, such that said large lever 4 totally removes itself from the month-management cam 2 and from the 31-days star 6, and subsequently such that the date-correcting beak 54, carried by the large lever 4 which continues pivoting actuates the 31-days star 6, the large lever 4 then being isolated, during the continuous rotation of the date-correcting cam 50 which is controlled by the rotation of the date-correcting stem, that is to say the winding stem 24 here.

The large lever 4 advantageously comprises an arm 57 having, at the height of the driving stud 56, an outline 58 shaped to be in the path of the driving stud 56 which is made to rotate by the date-correcting cam 50 such that the driving stud 56 remains in contact with the outline 58, while the date-correcting cam 50 and the large lever 4 pivot in their respective directions, and rests on said outline 58 by moving along said outline 58 so as to make the large lever 4 tilt at A in order to move said large lever 4 and, more particularly here the feeler spindle 20, sufficiently away from the month-management cam 2 and in order to move the beak 18 sufficiently away from the 31-days star 6, and also in order to continue pivoting the large lever 4 at A, the large lever 4 then being isolated until the month-correcting beak 54 actuates the 31-days star 6.

The date-correcting cam 50 and the large lever 4 are therefore arranged so that the stud 56 takes the large lever 4 so that it pivots at A by a sufficient angle in order to be isolated from the month-management cam 2 and from the 31-days star 6 and subsequently in order to actuate the 31-days star 6 by its date-correcting beak 54.

It will be noted that the pivot angle at A (here, in the clockwise direction, seen from above) of the large lever 4 driven by the month-correcting cam 22 for correcting the month is less than the pivot angle at A of the large lever 4 driven by the date-correcting cam 50 for correcting the date so as not to correct the date during a month correction when the correction of the date involves a change of month.

The outline 58 comprises, for example, two straight edges which are joined to form a point 60. The outline 58 is sufficiently long to move the large lever 4 away sufficiently in order to isolate it and in order to continue driving the large lever 4 in order to correct the date as such by the correcting beak 54.

The date-correcting cam 50 advantageously carries two studs 56 placed at 180° in order to make two corrections for each turn of the cam.

The date-correcting mechanism functions as follows:

With reference to FIGS. 1 and 2, when the correction mechanisms are in the neutral position, the winding stem 24 is in the neutral position, for example of winding, such that the sliding pinion 28 does not engage with the intermediate wheel 30. The perpetual date mechanism functions in the standard manner and is controlled by the movement of the timepiece. The date-correcting mechanism is not operational.

In the event of the date mechanism stopping, for example on a day in February of a non-leap year, which is not 28 February, the feeler spindle 20 of the large lever 4 is positioned in the deepest notch of the 48-months cam 2, this position being that in which the large lever 4 has the most angular movement to perform during the date correction in order to completely remove the feeler spindle 20 from the notch of the 48-months cam 2 so as not to break the mechanism during the date correction which brings about a change of month. The date-correcting cam 50 is positioned such that the driving stud 56 is in contact with the starting point of the outline 58 of the large lever 4.

Figure 10:
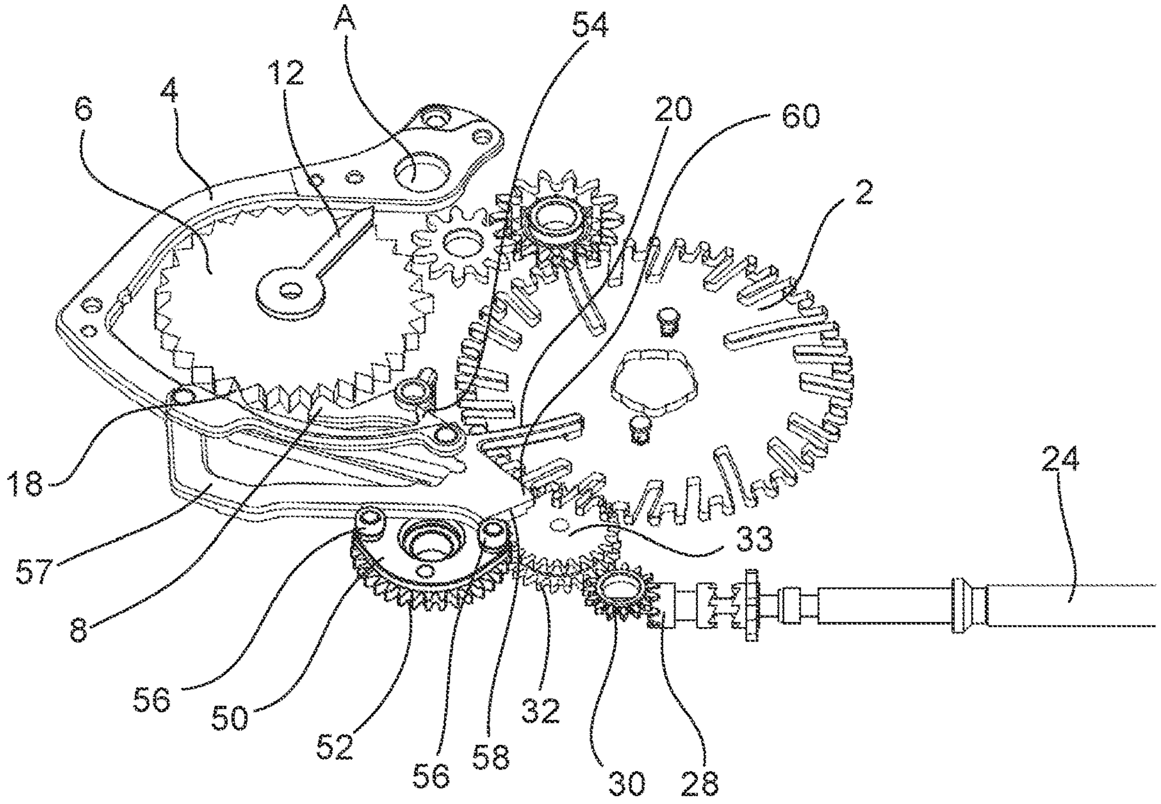
FIGS. 10 to 13 are top views of the date-correcting mechanism from FIG. 1 in different positions during the course of a date correction.

In order to correct the date, and with reference to FIG. 10, the winding stem 24 is moved axially such that the sliding pinion 28 engages with the intermediate wheel 30 and such that the second geartrain is formed by the movement of the wheel 32 in order to kinematically link the winding stem 24 to the wheel 52 which is rigidly connected to the date-correcting cam 50.

Figure 11:
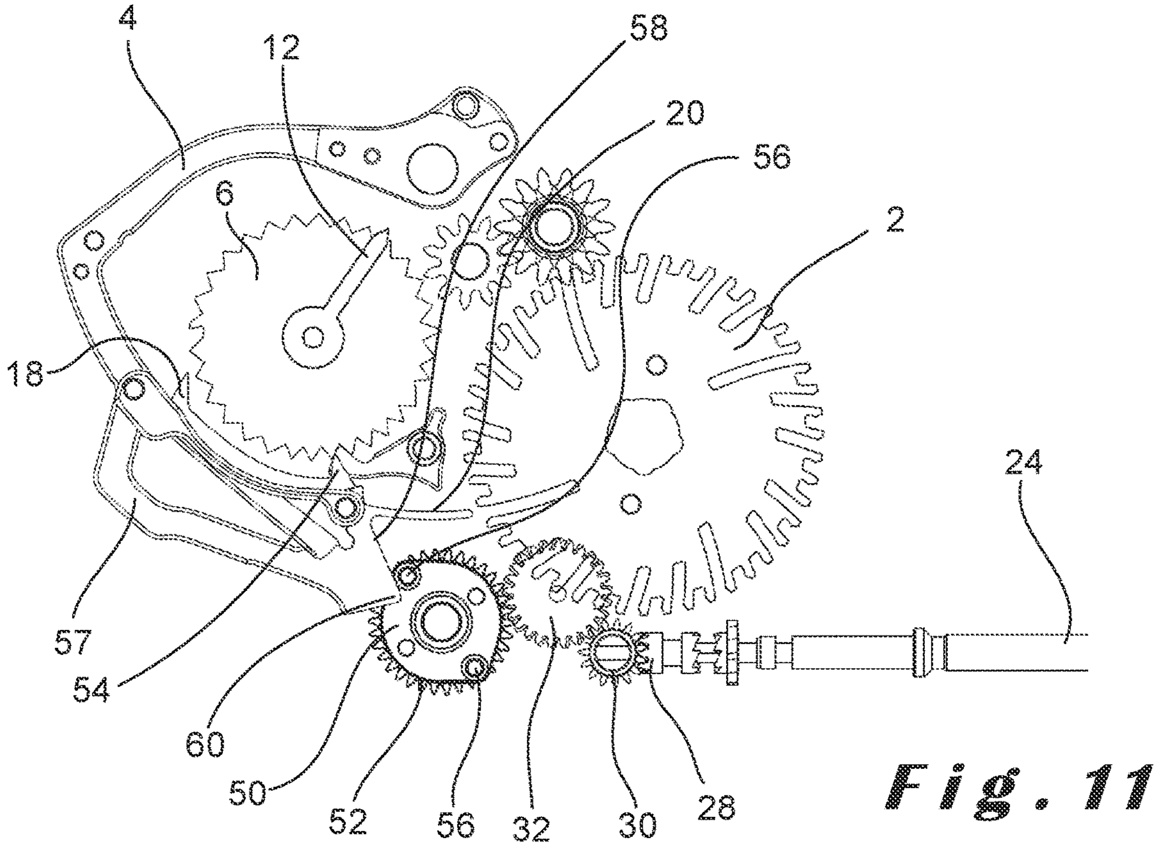

The winding stem 24 is then turned in one direction such that the date-correcting cam 50 is rotated in the anticlockwise direction, the date-correcting cam 50 being seen from above in FIG. 10. During this rotation, the driving stud 56 rests on the outline 58 of the large lever 4 such that the latter pivots at A in the clockwise direction. During this pivoting, the feeler spindle 20 of the large lever 4 moves away and completely exits the notch of the month-management cam 2 and the beak 18 of the large lever 4 removes itself completely from the 31-days star 6, as shown in FIG. 11, such that the large lever 4 is isolated. In parallel, the date-correcting beak 54 approaches the 31-days star 6.

Figure 12:
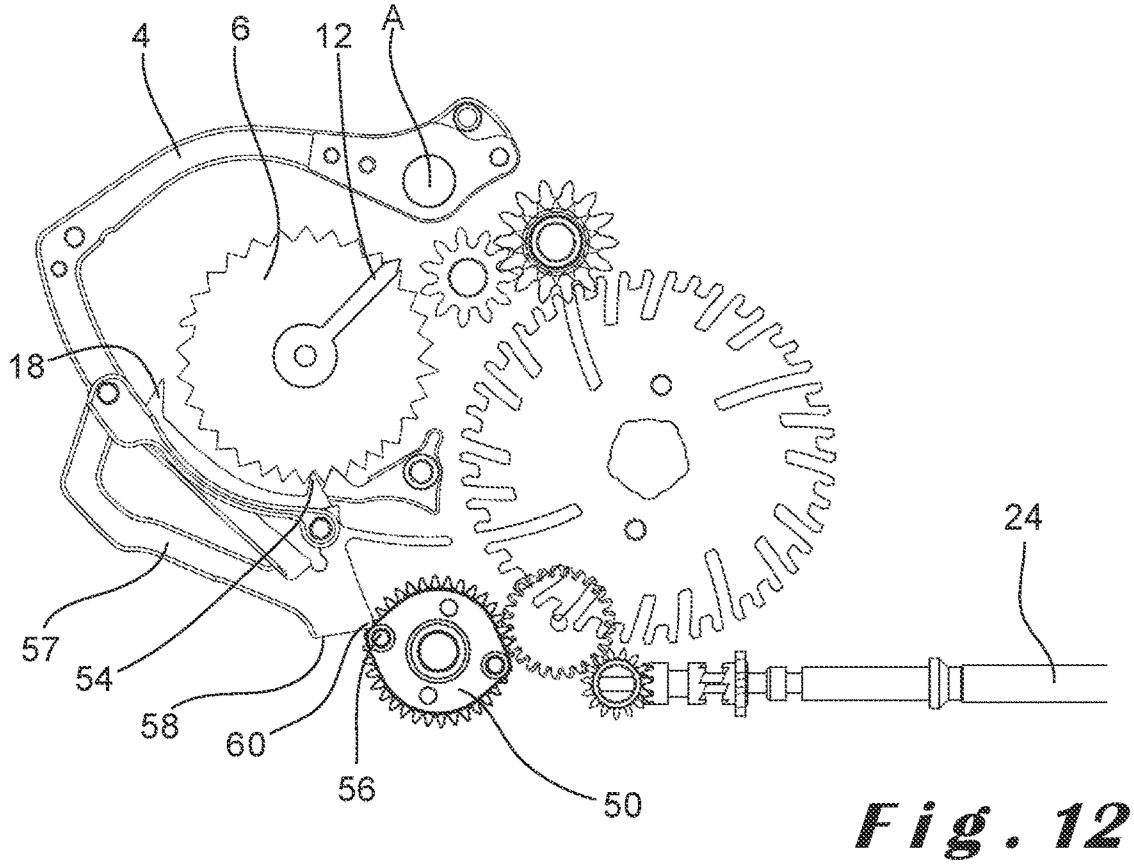

Subsequently, with reference to FIG. 12, the rotation of the winding stem 24 is continued, continuously rotating the date-correcting cam 50 such that the large lever 4 continues pivoting around its axis A in the clockwise direction until its date-correcting beak 54 meets a tooth of the 31-days star 6 and then rotates the 31-days star 6 by one step, which rotates the date-indicating member 12 and corrects it by one day of the month of February. In parallel, the date-correcting cam 50 continues rotating in the anticlockwise direction such that the driving stud 56 is located at the tip 60 of the outline 58 of the large lever 4, ready to no longer be in contact with said large lever 4.

Figure 13:
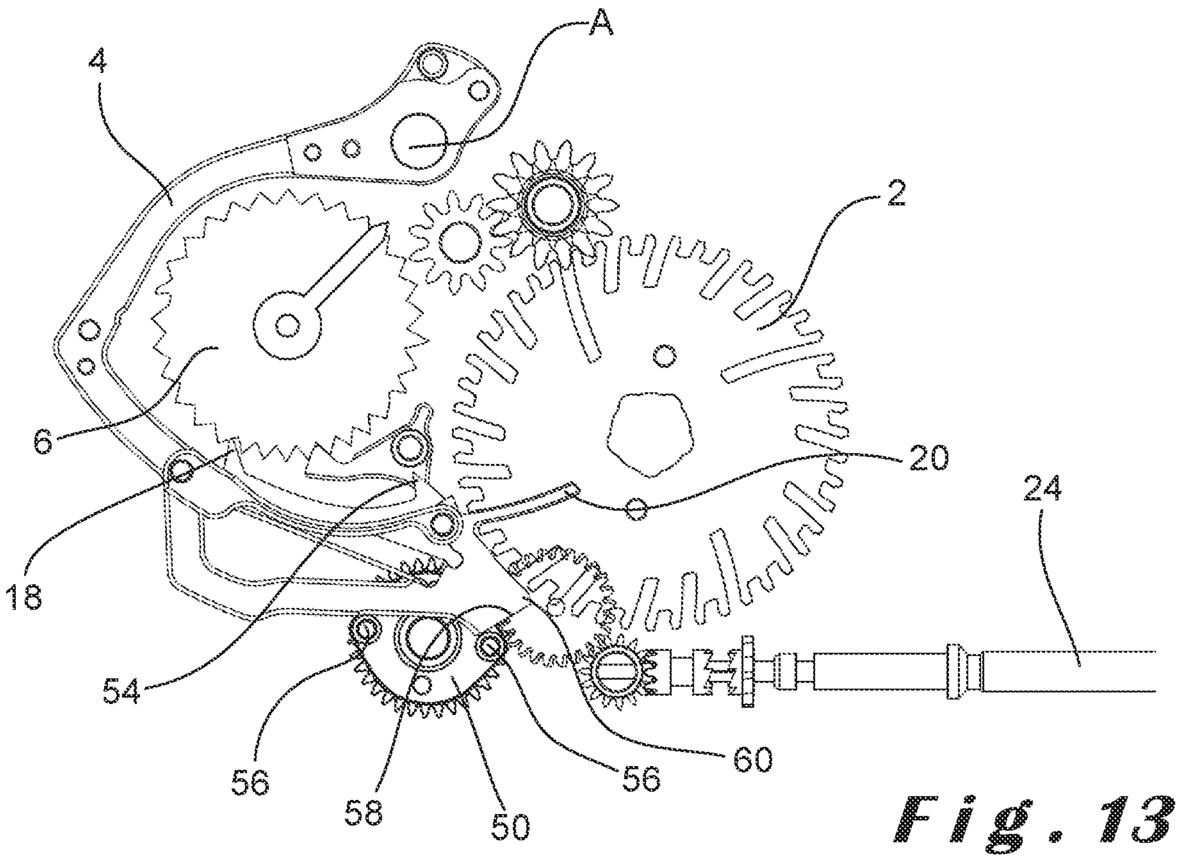

With reference to FIG. 13, once a correction by one step has been made, the rotation of the winding stem 24 is continued, continuously rotating the date-correcting cam 50 such that the leading stud 56 goes beyond the corner 60 of the large lever 4 which is then no longer driven by the date-correcting cam 50. The large lever 4 is then brought back by its return spring resting on the 48-months cam 2, its feeler spindle 20 falling back into the February notch of the 48-months cam 2 and the beak 18 coming back into contact with the 31-days star 6. In parallel, the correcting beak 54 has moved away from the 31-days star 6, and the starting point of the outline 58 of the arm 57 of the large lever comes back into contact with the other stud 56. The mechanism is then ready to make a new correction.

If another date correction is necessary, the rotation of the winding stem 24 is continued in order to continue rotating the date-correcting cam 50 such that the other stud 56 again drives the large lever 4, as described above.

Thus, the mechanisms of the invention make it possible to independently correct the month or the date, with a complete lifting of the large lever, solely by a limited number of rotations of a single winding stem, and can be implemented in a date mechanism in which an axial movement of the winding stem is not possible or not available for the isolation of the large lever.

The mechanisms of the invention therefore make it possible to eliminate the month and date correctors. This makes it possible to reduce the problems associated with water resistance and to improve the aesthetic appearance of the watch, the correctors which are usually provided on the flank of the middle of the watch being eliminated. This also makes it possible to correct the date or month without risk, because it is no longer possible to actuate two correctors at the same time since all of the corrections are combined on the winding stem. The mechanisms of the invention therefore make it possible to correct the month or the date, simply and without tools, in a secure manner, by simply rotating the winding stem.

It is obvious that, in the case of a perpetual calendar, the 48-months cam can be replaced, for example, by a 12-months cam and a leap year cam, the large lever being isolated from these two cams in the same way as described above. Likewise, in the case of an annual or semi-perpetual calendar, the 48-months cam is replaced by a 12-months cam or a 36-months cam, the large lever being isolated from these month management cams in the same way as that described above.

The invention claimed is:

1. A timepiece comprising an at least annual date mechanism (1) which comprises a month-management cam (2), a large lever (4) arranged to cooperate with said month-management cam, a date-indicating mechanism, a month-indicating mechanism, and at least one mechanism for independent correction of the date or month comprising at least one date-correcting or month-correcting member, respectively, arranged to cooperate with said date-indicating or month-indicating mechanism, respectively, characterized in that the date-correcting or month-correcting mechanism, respectively, comprises a date-correcting cam (50) or a month-correcting cam (22) respectively, mounted so as to be freely rotatable, a date-correcting or month-correcting stem, respectively, which can be rotated in order to rotate the date-correcting cam (50) or the month-correcting cam (22), respectively, said date-correcting cam (50) or month-correcting cam (22), respectively, being arranged so as to, during rotation thereof, drive the large lever (4) in order to isolate said large lever (4) at least from the month-management cam (2) before the date or month is corrected, respectively, and to drive the actuation of the date-correcting or month-correcting mechanism, respectively, in order to subsequently correct the date or month, respectively, the rotation of the date-correcting or month-correcting cam, respectively, being controlled solely by rotation of the date-correcting or month-correcting stem, respectively.

2. The timepiece according to claim 1, characterized in that the month-correcting member is a month-correcting pinion (36) kinematically linked to the month-indicating mechanism and placed on the path of the month-correcting cam (22).

3. The timepiece according to claim 2, characterized in that the month-correcting cam (22) comprises at least two arms (**22*a*, 22*b*), one of the arms (22*a*) being arranged to remove the large lever (4) from the month-management cam (2), and the other arm (22*b*) being arranged to subsequently actuate the month-correcting pinion (36), the large lever (4) being isolated, during the rotation of the month-correcting cam (22**) controlled by the rotation of the month-correcting stem.

4. The timepiece according to claim 3, characterized in that the large lever (4) comprises a feeler spindle (20) arranged to be capable of cooperating with one of the arms (**22*a*, 22*b*) of the month-correcting cam (22**).

5. The timepiece according to claim 4, characterized in that each arm (**22*a*, 22*b*) of the month-correcting cam (22) comprises an outline (40) shaped in order to make the feeler spindle (20) of the large lever (4) rise progressively on the arm (22*a*, 22*b*) until said large lever (4) is moved away from the month-management cam (2), said outline (40) ending by forming a beak (42) arranged to be capable of cooperating with the month-correcting pinion (36**).

6. The timepiece according to claim 3, characterized in that the month-correcting cam (22) is coaxial with the month-management cam (2).

7. The timepiece according to claim 1, characterized in that the date mechanism (1) comprises at least a 31-days star (6) and a month drive pinion (9) intended to cooperate, on the one hand, with said 31-days star (6) at the end of each month and, on the other hand, with the month-management cam (2), and in that the month-correcting pinion (36) is arranged to be kinematically linked to the month-management cam (2) by way of said month drive pinion (9).

8. The timepiece according to claim 7, characterized in that the month-correcting pinion (36) is rigidly connected to the month drive pinion (9).

9. The timepiece according to claim 1, characterized in that the month-indicating mechanism comprises a month-indicating pinion (14) carrying a month-indicating member (16) and engaging with the month-management cam (2).

10. The timepiece according to claim 1, characterized in that the date-correcting member is a date-correcting beak (54) mounted movably in rotation on the large lever (4) and provided with a return spring, and arranged to be capable of cooperating with the date-indicating mechanism when the date-correcting cam (50) drives the large lever (4) once it is isolated from the month-management cam (2).

11. The timepiece according to claim 10, characterized in that the date-correcting cam (50) carries at least one stud (56) arranged to drive the large lever (4) such that said large lever (4) removes itself at least from the month-management cam (2) and subsequently such that the date-correcting beak (54) actuates said 31-days star (6), the large lever (4) being isolated, during the rotation of the date-correcting cam (50) which is controlled by the rotation of the date-correcting stem.

12. The timepiece according to claim 1, characterized in that the date-correcting stem and/or the month-correcting stem are constituted by the winding stem (24) of the timepiece, said winding stem (24) being arranged so that its rotation in one direction corrects the month, its rotation in the other direction correcting the date.

13. The timepiece according to claim 12, characterized in that the month-correcting mechanism comprises a first geartrain kinematically linking the winding stem (24) to the month-correcting cam (22), said first geartrain comprising a first wheel (32) cooperating with the sliding pinion (28) carried by the winding stem (24), and a last wheel (35) rigidly connected to the month-correcting cam (22).

14. The timepiece according to claim 12, characterized in that the date-correcting mechanism comprises a second geartrain kinematically linking the sliding pinion (28) carried by the winding stem (24) to the date-correcting cam (50).

* * * * *